(12) United States Patent
Hoffmann et al.

(10) Patent No.: US 12,007,225 B2
(45) Date of Patent: Jun. 11, 2024

(54) SYSTEM AND METHOD FOR ANALYSING A SURFACE THAT IS SUBJECT TO WEAR

(71) Applicant: Metso Sweden AB, Trelleborg (SE)

(72) Inventors: Andreas Hoffmann, Trelleborg (SE); Lars Furtenbach, Skellefteå (SE)

(73) Assignee: Metso Sweden AB, Trelleborg (SE)

( * ) Notice: Subject to any disclaimer, the term of this patent is extended or adjusted under 35 U.S.C. 154(b) by 660 days.

(21) Appl. No.: 17/057,966

(22) PCT Filed: May 29, 2019

(86) PCT No.: PCT/SE2019/050505
§ 371 (c)(1),
(2) Date: Nov. 23, 2020

(87) PCT Pub. No.: WO2019/231389
PCT Pub. Date: Dec. 5, 2019

(65) Prior Publication Data
US 2021/0215478 A1    Jul. 15, 2021

(30) Foreign Application Priority Data
May 31, 2018   (SE) .................................... 1850660-0

(51) Int. Cl.
*G01B 11/30*   (2006.01)
*B02C 17/18*   (2006.01)

(52) U.S. Cl.
CPC .......... *G01B 11/30* (2013.01); *B02C 17/1805* (2013.01); *B02C 2210/02* (2013.01)

(58) Field of Classification Search
CPC .. B02C 17/1805; B02C 2210/02; G01B 11/30
See application file for complete search history.

(56) References Cited

U.S. PATENT DOCUMENTS

| | | | |
|---|---|---|---|
| 6,780,351 | B2 | 8/2004 | Wirth |
| 6,922,251 | B1 | 7/2005 | Kirchhoff et al. |
| 9,625,253 | B2 | 4/2017 | Stewart et al. |
| 2002/0158368 | A1 | 10/2002 | Wirth |
| 2010/0164951 | A1 | 7/2010 | Stewart |

(Continued)

FOREIGN PATENT DOCUMENTS

| | | |
|---|---|---|
| CN | 101270462 A | 9/2008 |
| CN | 108010121 A | 5/2018 |
| EP | 1899678 B1 | 7/2013 |

(Continued)

OTHER PUBLICATIONS

Blunt et al. "Three-dimensional measurement of the surface topography of ceramic and metallic orthopedic joint prostheses", 2000, Journal of Material Science, pp. 235-246. (Year: 2000).*

(Continued)

*Primary Examiner* — Elias Desta
(74) *Attorney, Agent, or Firm* — Andrus Intellectual Property Law, LLP

(57) ABSTRACT

The disclosure relates to a system for analyzing a wear surface in a material handling system. The system including a scanner and a processor configured to generate measurement data. The disclosure further comprises a corresponding method for utilizing the system for analyzing a wear surface.

4 Claims, 14 Drawing Sheets

(56) References Cited

U.S. PATENT DOCUMENTS

2012/0232835 A1    9/2012    Chang et al.
2016/0018341 A1    1/2016    Harvill

FOREIGN PATENT DOCUMENTS

WO    2007000010 A1    1/2007
WO    2008074088 A1    6/2008

OTHER PUBLICATIONS

Vucina et al., "Evaluation of 3D tool wear in machining by successive stereo-pphotogrammetry and point cloud processing", 2013, Research Gate. (Year: 2013).*
Office Action and Search Report for Finnish U.S. Appl. No. 20/206,332, dated Jan. 16, 2023.
Office action and search report for corresponding Chinese Patent Application No. 201980050819.X dated Oct. 25, 2021.
International Search Report and Written Opinion for International Patent Application No. PCT/SE2019/050505 dated Jul. 24, 2019.

* cited by examiner

SYSTEM AND METHOD FOR ANALYSING A SURFACE THAT IS SUBJECT TO WEAR

CROSS-REFERENCE TO RELATED APPLICATIONS

This application is the U.S. national stage application of International Application PCT/SE2019/050505, filed May 29, 2019, which international application was published on Dec. 5, 2019, as International Publication WO 2019/231389 A1 in the English language. The International Application claims priority of Swedish Patent Application No. 1850660-0 filed May 31, 2018.

TECHNICAL FIELD

The present disclosure relates to analysing surfaces that are subject to wear, such as surfaces of mill liners, crushers and the like.

BACKGROUND ART

In various types of mineral processing, ore is processed in cylindrical grinding mills. Rotation of the grinding mills causes pieces of ore therein to tumble, grinding the ore. The mill contents may include grinding media such as balls, rods, or other types of grinding media.

These cylindrical mills generally include a replaceable lining, which protects the shell of the mill from damage and erosion. These liners generally include lifter bars, which lift the ore and ball charge as the mill rotates, to improve grinding efficiency.

Eventually, these liners wear out and must be replaced. Assessing the state of the liner is important, both to prevent damage to the mill shell and possible consequent catastrophic failure of the mill, and to ensure that the mill is operating efficiently.

Initially, this was performed by stopping the mill and manually measuring the liner. Several problems exist with such method, including that the process can be dangerous to the operator performing the measurements, and can be inaccurate. In particular, only a small number of points of the liner are tested, and the method is generally reliant on the operator manually selecting representative points.

More recently, three-dimensional (3D) laser scanners have been used to scan an inner surface of the liner. In particular, a 3D laser scanner is placed inside the mill, and used to generate point cloud data representative of an inner surface of the liner. This point cloud data is then transformed and mapped onto a reference model of the mill to enable wear analysis. An example of such system is described in WO2007000010.

A problem with such systems, including the system described in WO2007000010, is that they are very complex. In particular, modern 3D scanners generate very large point clouds which must be scaled and transformed between different coordinate systems and analysed. If the number of points in the point cloud is reduced, the resolution of the mapping data is also reduced, which results in a decrease in accuracy.

As such, there is clearly a need for improved systems and methods for analysing surfaces that are subject to wear.

It will be clearly understood that, if a prior art publication is referred to herein, this reference does not constitute an admission that the publication forms part of the common general knowledge in the art any country.

SUMMARY

The present disclosure relates to systems and methods for analysing surfaces that are subject to wear, which may at least partially overcome at least one of the abovementioned disadvantages or provide the consumer with a useful or commercial choice.

With the foregoing in view, the present disclosure in one form provides a system for analysing a three-dimensional wear surface to generate scalar measurement data therefrom, the system including:
 a scanner, configured to generate point cloud data of the three-dimensional wear surface; and
 a processor, configured to receive the point cloud data and generate the scalar measurement data therefrom by:
  generating a plurality of subsets of points of the point cloud data; and
  from each of the plurality of subsets, selecting a scalar measurement associated with a point of the subset to form the scalar measurement data.

The wear surface may be a wear surface of a material handling apparatus or system. The material handling apparatus or system may be, for example, a mill or crusher for mineral processing.

Advantageously, the system enables high resolution analysis of the wear surface without requiring that the point cloud data of the three-dimensional wear surface to be transformed into a coordinate system of a model of the three-dimensional wear surface, which is a very computationally complex and memory intensive procedure. Furthermore, as the scanner is used to generate the measurements, this may be performed without requiring an operator to manually take measurements from inside the area, which in the case of a mill is generally a dangerous area.

Preferably, the system is further configured to assess wear or irregularity of the three-dimensional wear surface based upon the scalar measurement data.

Preferably, the wear surface comprises a replaceable liner. The replaceable liner may comprise a liner of a mill.

The processor may be further configured to generate a central point or axis based upon the point cloud data. The scalar measurement may be generated with reference to the central point or axis.

The central point or axis may be generated based upon operator input. The central point or axis may be generated by: coarsely estimating the central point or axis, and enabling the operator to refine the central point or axis manually.

The central point or axis may be automatically generated by the processor.

Preferably, the scalar measurement associated with one of the points of the subset is selected according to a value of the scalar measurement. A scalar measurement may be determined for each point of the subset, and the scalar measurement may be selected based upon an extreme scalar measurement from within the subset. As an illustrative example, a maximum (or minimum) measurement may be selected from each of the subsets.

Preferably, a difference in measurement data within a subset is indicative of a difference in wear of points of the wear surface corresponding to that subset. In particular, each subset of points may be chosen such that any difference in measurement relating to the points primarily corresponds to a difference in wear at those points.

The plurality of subsets of the point cloud data may be generated based upon their location with reference to the axis.

The surface may have a substantially uniform cross section, and each subset of points may correspond to a set of points along a length of the surface. As such, each subset of points may correspond to a substantially linear section of the wear surface. Each subset of points may comprise a line of points which extends through the point cloud corresponding to the point cloud data in substantially the same direction as an axis of the surface.

The surface may be axially symmetrical, conical or frustoconical in shape, and each subset may correspond to a set of points at a particular position along an axis of the surface. As such, each subset of points may correspond to a substantially circular section of the wear surface.

The processor may be configured to generate a subset of the scalar measurement data. The subset of the scalar measurement data may be selected according to a determined point or axis. In the case of a substantially axially symmetric surface, the subset may comprise a slice centred around an axis of the surface.

The processor may be configured to receive parameters from an operator, the parameters defining certain data (e.g. extreme values) to be excluded from analysis.

The processor may be configured to receive parameters associated with the wear surface. In particular, the wear surface may comprise a mill liner, and the parameters associated with the mill liner may include mill parameters.

Preferably, the processor is configured to render the point cloud data. The processor may be configured to enable rotation of the point cloud data based upon user interaction.

Preferably, the processor is configured to enable an operator to manually delete unwanted parts of the point cloud by entering input parameters relating thereto. The point cloud may be rendered such that the points of the point cloud that are identified to be deleted are differentiable from points of the point cloud that are not identified to be deleted. Suitably, points of the point cloud that are identified to be deleted are rendered in a different colour to points of the point cloud that are not identified to be deleted.

The parameters may define one or more shapes, outside of which points are identified to be deleted. The parameters may define one or more planes, above or below which points are identified to be deleted.

The processor may be configured to enable an operator to enter one or more reference points or planes. The operator may identify areas of the point cloud data with reference to the reference points or planes. Points to which a scalar measurement is not to be generated may be defined according to the reference points or planes. Such groups of points may be referred to as deadbands.

The processor may be configured to apply a filter to the point cloud data, to remove outliers. The filter may comprise a median filter.

The processor may be configured to present the scalar measurement data as a plot.

Preferably, the scanner comprises a laser scanner.

In another form, the disclosure provides a method for analysing a three-dimensional wear surface in a material handling system to generate scalar measurement data therefrom, the method including:
  scanning, with a scanner, the three-dimensional wear surface to generate point cloud data; and
  generating the scalar measurement data from the point cloud data by:
    generating a plurality of subsets of points of the point cloud data; and
    from each of the plurality of subsets, selecting a scalar measurement associated with a point of the subset to form the scalar measurement data.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments in accordance with the present disclosure will be described with reference to the following drawings, in which:

FIG. 2b is a schematic representation of the part of the point cloud of FIG. 2a;

Preferred features, embodiments and variations may be discerned from the following Description of Embodiments which provides sufficient information for those skilled in the art to perform the invention. The Description of Embodiments is not to be regarded as limiting the scope of the preceding Summary in any way.

DESCRIPTION OF EMBODIMENTS

Figure 1:
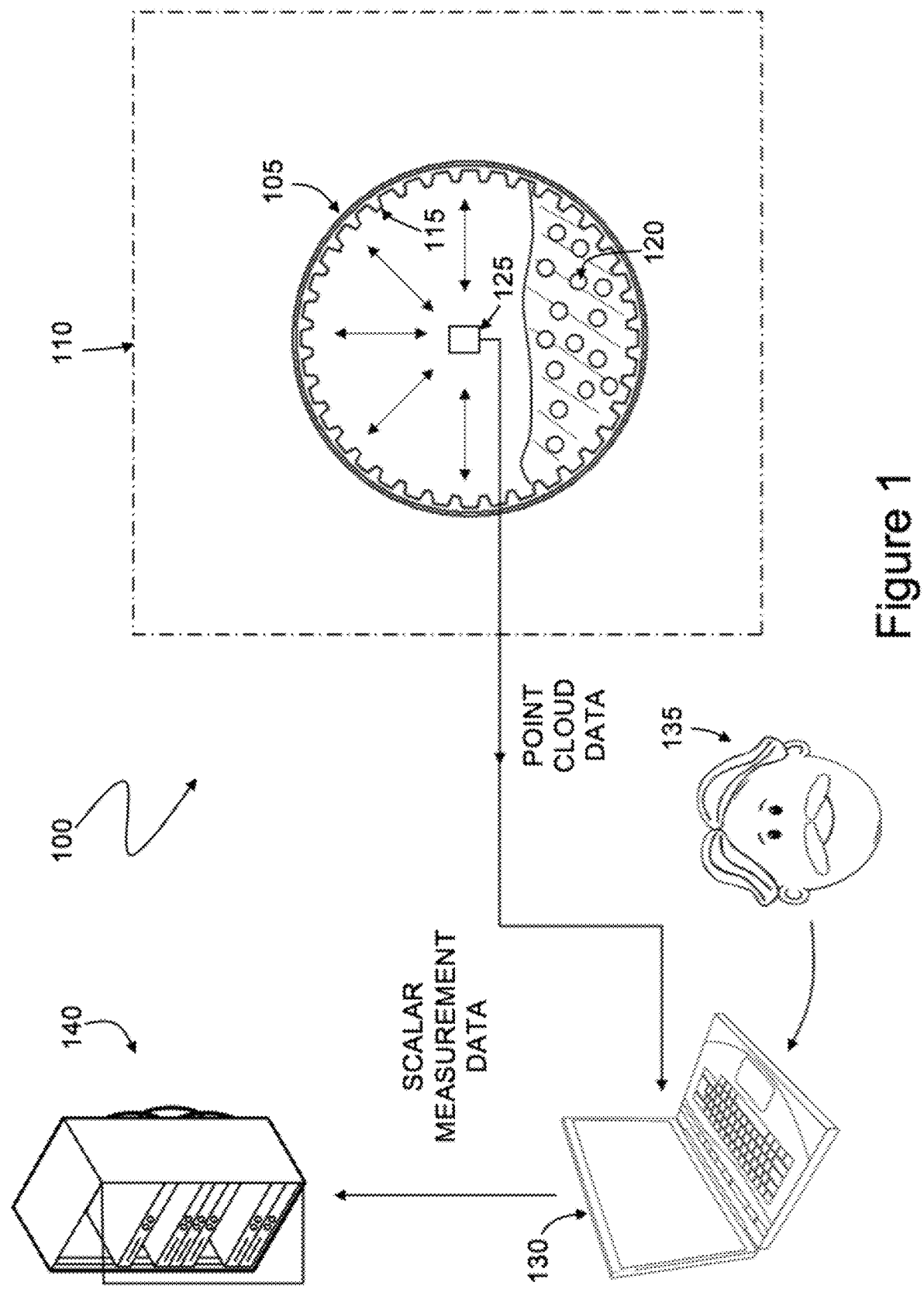
FIG. 1 illustrates a system for analysing a surface of a mill liner that is subject to wear, according to an embodiment.

FIG. 1 illustrates a system 100 for analysing a surface of a mill liner that is subject to wear, according to an embodiment of the present disclosure. The system 100 enables high resolution wear analysis of a wear surface in a manner that is low in computational complexity and low in memory requirements. In particular, the system 100 does not require that the point cloud data of the mill liner, which is very large and complex in high resolution analysis, be transformed between coordinate systems, or otherwise mapped onto a 3D model of the surface.

The system 100 includes a mill 105 in a plant area 110 which is configured to grind ore. The mill 105 includes a replaceable liner 115. Rotation of the mill 105 causes ore pieces and ball charge 120 therein to tumble, thus grinding the ore. As the mill 105 is used, the replaceable liner 115 wears, and eventually must be replaced. In the illustrated embodiment the liner comprises a plurality of lifters bars, but it will be appreciated that in other embodiments the configuration of the liner inner surface may be different, for example without lifter bars or having a wave shaped configuration.

In order to analyse the surface of the mill liner 115, the mill 105 is stopped, and a three-dimensional (3D) scanner 125, such as a laser scanner, is placed therein. The scanner 125 is generally small, and can thus can be attached to an arm (not shown) and held in place in a central portion of the mill 105 during scanning. The arm may extend through an access hole of the mill 105, alleviating the need for an operator to enter the mill 105. Alternatively, the scanner may be manually positioned inside the mill, for example using a tripod.

The scanner 125 may comprise a time of flight laser range-finder (often referred to as simply a 3D laser scanner), configured to transmit laser radiation towards the inner surface of the liner 115 This laser radiation is reflected from the surface of the liner 115, and received back at the scanner 125. This process is performed on a large number of points on the surface, either simultaneously, or over time, to generate a detailed point cloud describing the interior surface (or wear surface) of the liner 115. Laser scanners are well known and are commercially available.

Once data capture is complete, the scanner 125 is removed from the mill 105 and the point cloud data is provided to an operator computer 130 for initial analysis. The point cloud data may be provided to the operator computer 130 in any suitable way, including by coupling the laser scanner 125 to the operator computer 130, or exporting the data from the scanner 125 and manually moving it to the computer 130, e.g. using a removable memory.

An operator 135 then uses processing software on the operator computer 130 to generate scalar measurement data from the 3D point cloud data.

Initially, a centre line of the relevant (generally cylindrical) part of the 3D point cloud data is determined based upon the received point cloud data. This may be performed by first automatically determining an approximate centre line of the relevant (generally cylindrical) part of the 3D point cloud data, and later refining that centre line, either with help of the operator 135, or by using more detailed data analysis. In other words, the centre line may be determined automatically, semi-automatically, or manually.

Once the centre line is determined, a plurality of subsets of the point cloud data are generated based upon their location with reference to the centre line. In particular, the point cloud data is split into subsets according to an angle with reference to the centre line. As such, each subset of data corresponds to a row of points along a length of the mill liner 115.

Figure 2B:
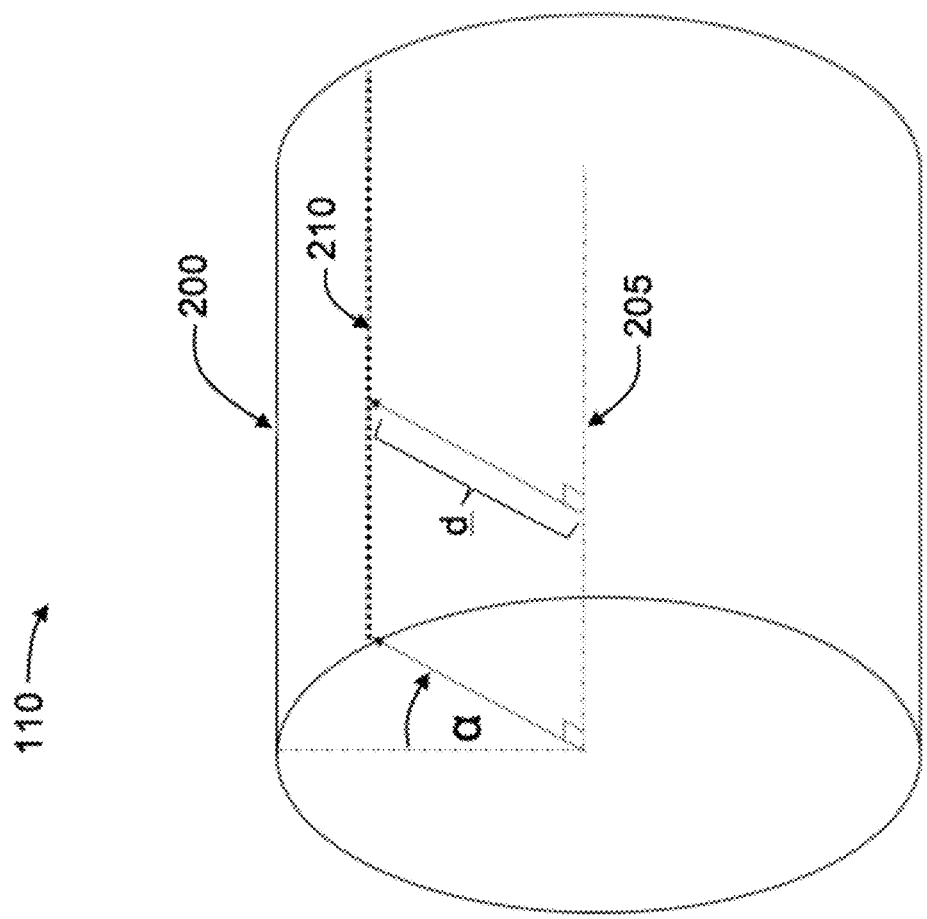
Figure 2A:
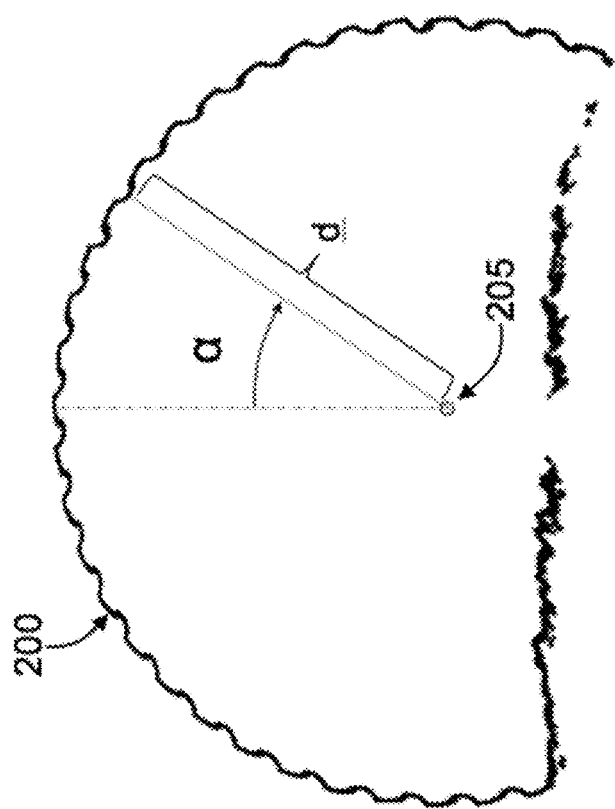
FIG. 2a illustrates an end view of a relevant part of a point cloud of the system of FIG. 1.

FIG. 2a illustrates a cross sectional view of a point cloud 200 illustrating the centre line 205, and an angle α defining a subset of point cloud data. FIG. 2b illustrates a simplified perspective view of the point cloud data 200 illustrating the subset of the point cloud data 210 corresponding to the angle α. In FIG. 2b, the point cloud data 200 is illustrated with reference to a cylinder that roughly corresponds to the point cloud data 200, for clarity purposes only.

The angle α is defined with reference to an arbitrary direction normal to the centre line 205, in this case a vertical direction 215. As such, the angle α has no particular absolute meaning with reference to the mill 105 or the point cloud 200, but instead is useful in providing relative meaning between the angles.

As outlined above, each subset of the point cloud data is generated based upon their location with reference to the centre line, and at a particular angle in relation thereto. The subset of the point cloud data 210 illustrated in FIG. 2 thus comprises a strip of point cloud values in a strip along the length of the point cloud 200. Each subset is similar to the subset 210 illustrated in FIGS. 2a and 2b, but for a different strip of values at a different angle on the circumference of the point cloud 200.

For each subset of points from the point cloud 200 (or strip of values along a length of the point cloud 200), a distance is determined for each point in the subset from the centre line 205 in a direction normal to the centre line 205. This is achieved by comparing each point in the point cloud 200 (in its original coordinate system), with a corresponding point on the centre line 205 (which was generated based on the point cloud data and is thus in the coordinate system of the point cloud data).

For a particular point cloud point $(x_1, y_1, z_1)$, and a corresponding point on the centre line 205 $(x_2, y_2, z_2)$, this distance d may be determined according to $d=\sqrt{(x_1-x_2)^2+(y_1-y_2)^2+(z_1-z_2)^2}$.

A maximum value of all the distances within the subset of points is then stored for that subset of points. In an embodiment the maximum value of all the distances within the subset is found by determining a distance value for two points, comparing, retaining the greater distance value as a current maximum distance value and discarding the lesser, and then repeating for the next, and each subsequent point in the subset. Thus it is not necessary to store distance values for each point in the subset. As the liner 115 when unworn is substantially uniform along its length (excluding the ends, and at joins between liner segments), the distances from the centre line 205 on an unworn liner are substantially uniform. However, as the liner 115 wears, wear may be uneven, and maximum distance values may be particularly useful in determining an indicative lifespan the liner 115.

Once a maximum distance has been selected for each of the subsets of points, these maximum distance values (i.e. one per subset of points), or a smaller subset of the maximum distance values, are exported as scalar measurement data. In the system 100, these maximum distance values are exported to a server 140, where they may be compared with reference values associated with the mill 105. However, in other embodiments, the points may be exported to a file, and analysed on the same computer (e.g. in different software), or on a different computer, for example.

The scalar measurement data comprising the maximum distance values is preferably exported as a string of values, or as space or comma separated values, which enables interoperability with a wide range of analysis software. This also enables the data to be plotted and manually viewed on a wide range of software.

Figure 3:
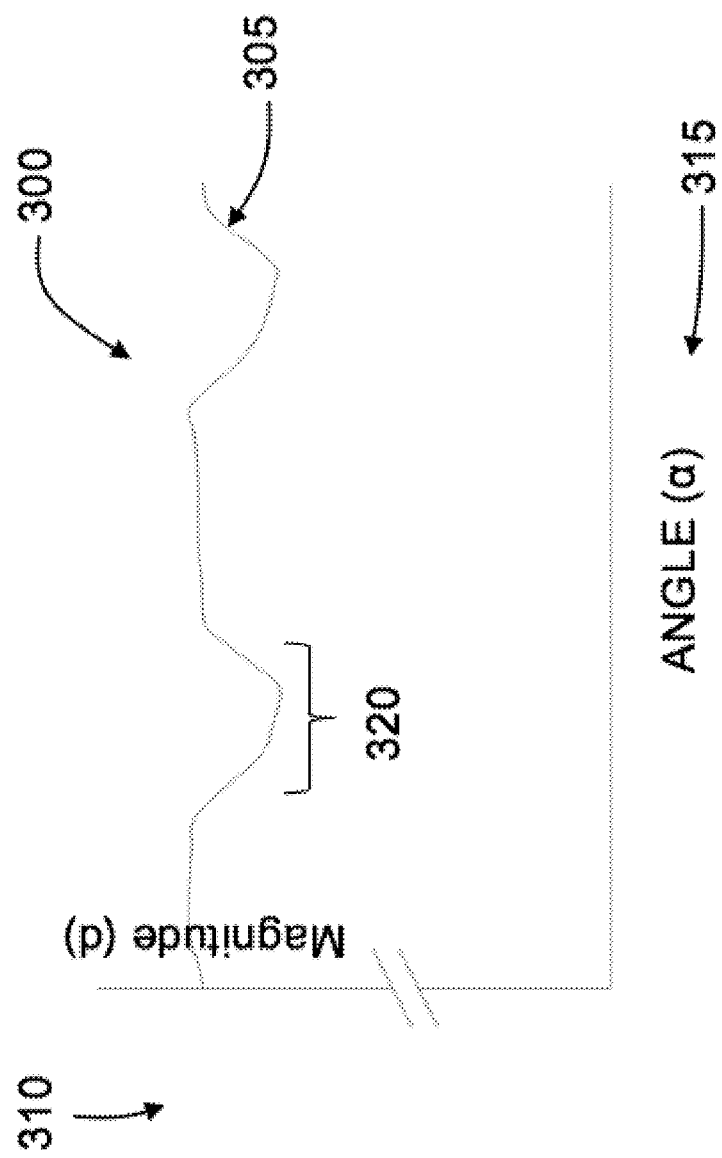
FIG. 3 illustrates a plot of scalar measurement data relating to a portion of a mill liner, according to an embodiment.

FIG. 3 illustrates a plot 300 of scalar measurement data relating to a portion of a mill liner 115, according to an embodiment of the present disclosure.

The plot 300 illustrates a magnitude of each of a plurality of scalar data points 305 on a first axis 310, and an angle (a)

associated with each of the points on a second axis 315. The plot 300 includes peaks and valleys that correspond to areas without lifters and areas with lifters, respectively. In particular, as the magnitude is measured with reference to the centre line 205 which extends along a centre of the point cloud, the lifters correspond to areas closer to the centre line 205, and as such, have lower values. One area corresponding to an area with a lifter is identified in area 320.

As outlined above, the angle (a) has no physical meaning in absolute terms, but instead defines a relative relationship between areas, which in turn enables adjacent areas to be compared to each other. As an illustrative example, and as can be seen from the plot 300, the lifter bars are periodically positioned along the liner 115. As such, adjacent lifter bars can be compared in the scalar measurement data using prior knowledge of the lifter bar spacing and the angle (a).

While being presented in the plot 300 as a two-dimensional array, it is important to note that the plot does not correspond to a slice of the mill liner 115 at all, but instead to extreme wear values that may be spread across a length of the mill liner 115. Furthermore, the position along the length of the mill 105 (or portion thereof) from where the points come from is not associated with the data. As an illustrative example, two adjacent points in the scalar data points 305 may correspond to regions several metres apart in the mill liner 115. Having said this, exactly where on the liner 115 the scalar measurement data relates is not required when evaluating overall or maximum wear of the liner 115. However, as will be illustrated in due course, it is common for a mill liner to be formed as a number of liner rings, and in an embodiment the scalar measurement data is provided for each ring, enabling wear of each ring to be assessed.

The server 140 may comprise a cloud-based evaluation tool, which enables parameters of the mill 105 to be entered, and the maximum distance values may be compared with reference values associated with the mill liners 115. As the scalar measurement data requires significantly less memory than the point cloud data, transmission of the scalar measurement data is much faster than the corresponding point cloud data.

Furthermore, it will be appreciated that in the described embodiment the exported scalar measurement data comprises a maximum distance value for each subset of points. A subset of points may be a strip of points a metre or so in length. As such, there far fewer scalar data points to store, transmit and process than there would be point cloud points if the point cloud were to be exported.

In addition to the user interaction described above, the operator 135 may remove data from the point cloud, exclude certain data from analysis (e.g. extreme values), and/or select particular data (e.g. a segment of the point cloud).

FIGS. 4-13 below illustrate screenshots of an embodiment of disclosure, where an operator is interacting with an operator computer, which may be similar to the operator computer 130, to generate scalar measurement data.

Figure 4:
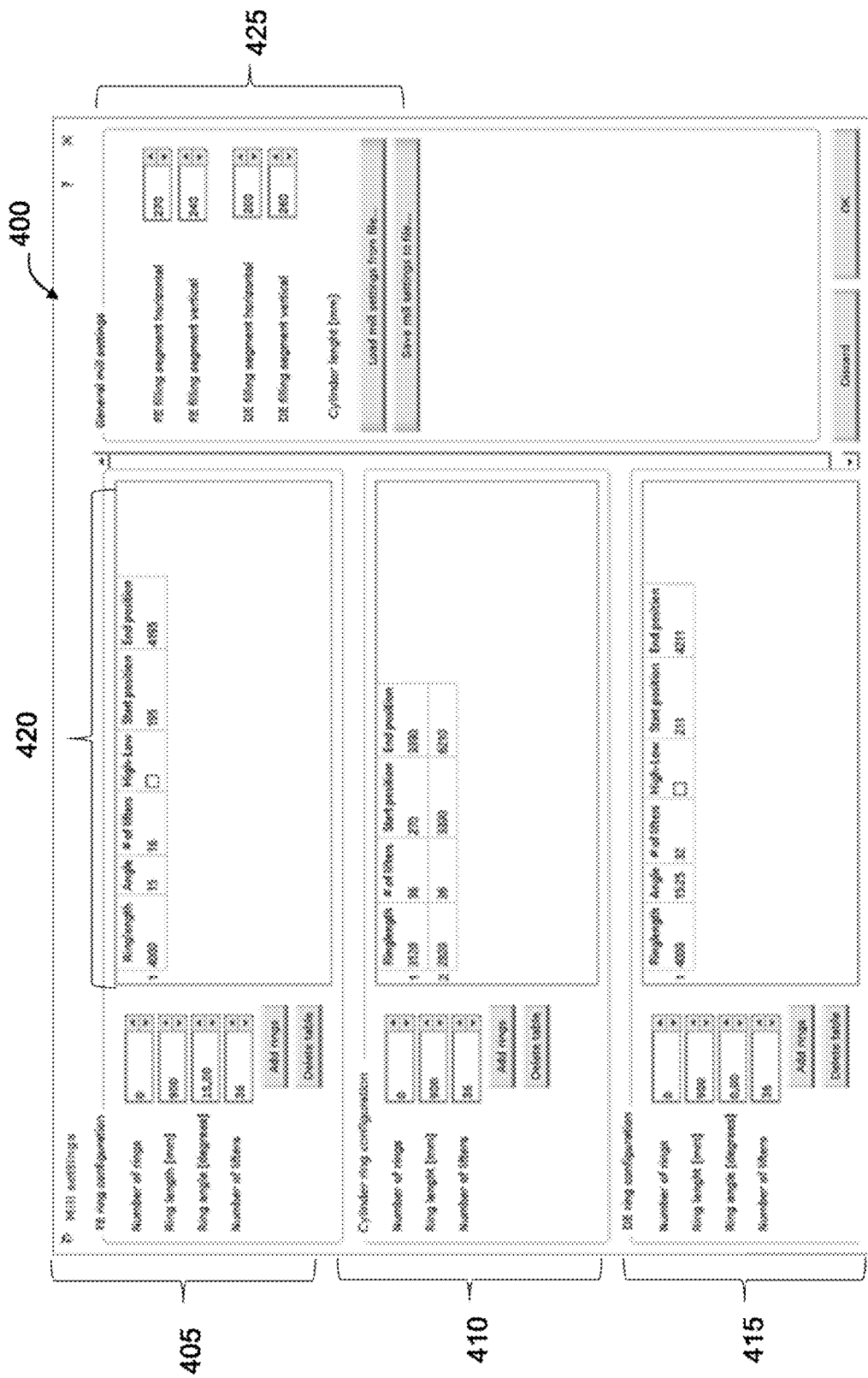
FIG. 4 illustrates a screenshot of a mill settings input screen, according to an embodiment.

Initially, the operator enters certain parameters of a mill into a graphical user interface. FIG. 4 illustrates a screenshot 400 of a mill settings input screen, according to an embodiment of the present disclosure. These parameters are used to determine areas in which the scalar values are calculated, and when aligning the centre line.

The mill settings input screen includes a feed entry (FE) ring configuration section 405, a cylinder ring configuration section 410, and a discharge exit (DE) ring configuration section 415, for entering configuration data relating to a ring configuration of a FE section of the liner, a cylinder or central section of the liner, and a DE section of the liner respectively.

The FE ring configuration section 405, the cylinder ring configuration section 410, and the DE ring configuration section 415 include various configuration menus, including a number of rings menu, a ring length menu, a number of lifters menu, for defining a number of rings, a ring length and a number of lifters, respectively. The FE and DE ring configuration sections 405, 415 also include a ring angle menu, for defining an angle of the rings.

When configurations are entered in to the FE ring configuration section 405, the cylinder ring configuration section 410, and the DE ring configuration section 415, corresponding table entries are generated and added into a table section 420. The table section 420 enables the operator to view the parameters that he or she has added, and change these if appropriate.

Finally, the mill settings input screen includes a general mill settings section 425, including FE filling segment (horizontal and vertical) menus and DE filling segment (horizontal and vertical) menus for defining FE and DE filling segment parameters.

While the above section refers to the term "mill settings", the skilled addressee will readily appreciate that these settings relate to the liner portion of the mill which is being measured.

In addition to manually entering parameter data into the menus above, the mill settings input screen enables the operator to load mill settings from a file, and in the case that mill setting data has already been added, save the mill settings to the file.

It may be useful to also include an option for input of an approximate value for the mill diameter, as this can be used to assist in determining the centre line of the relevant part of the point cloud. If desired, an 'approximate mill diameter' menu may be included, for example in the general mill settings section 425, allowing entry of an approximate mill diameter. In an embodiment menu options are provided for selecting a value for the approximate mill diameter, providing 200 mm increments for selection.

These parameters are all scalar quantities and are primarily used to select points on the liner that are not to be measured.

Figure 5:
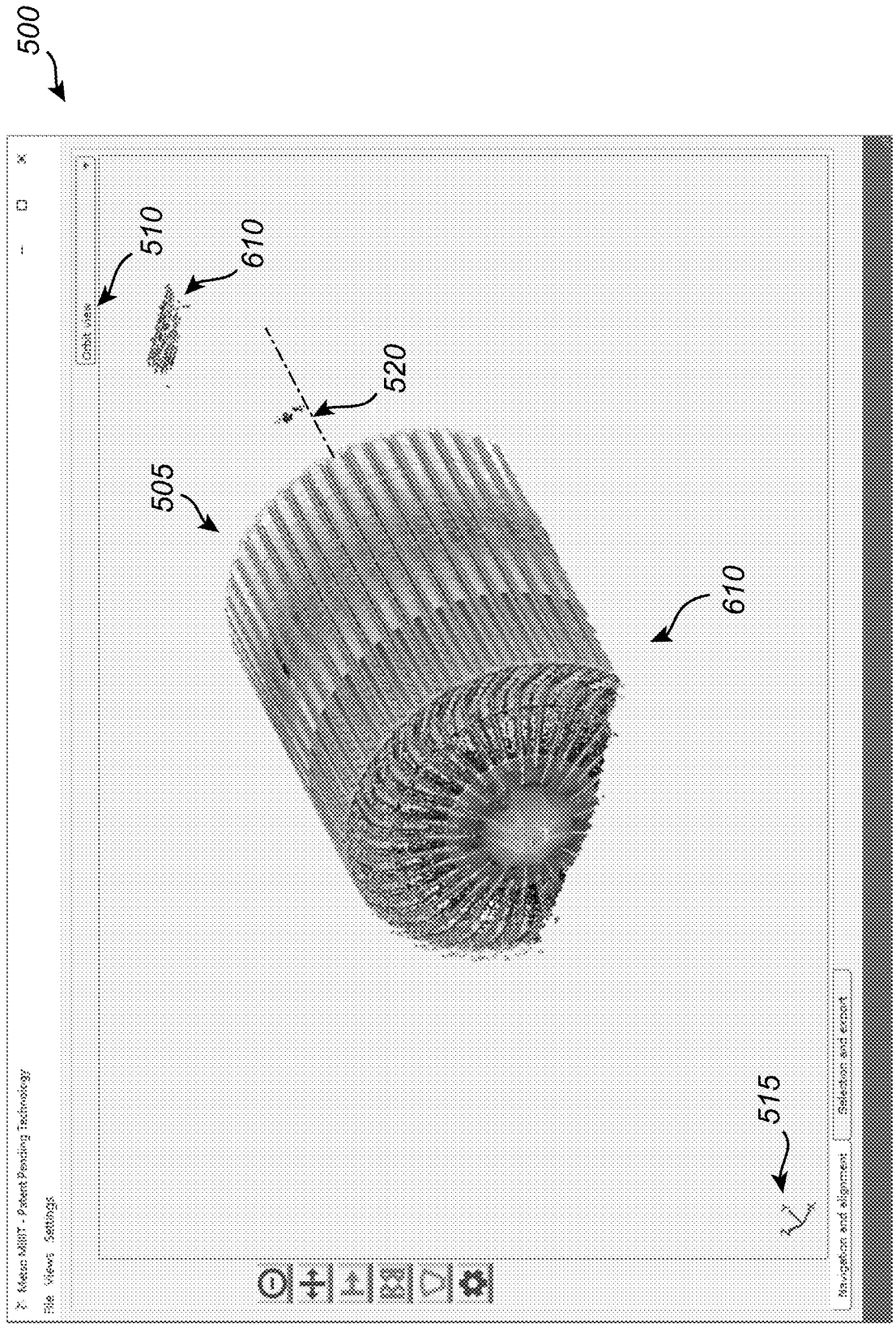
FIG. 5 illustrates a screenshot of a point cloud display screen, according to an embodiment.

Once the mill settings are entered, point cloud data is imported. The point cloud can be imported in its native format from the 3D scanner (e.g. in FLS format), or in a generic xyz-format. When the point cloud data is imported, it is displayed to the operator. FIG. 5 illustrates a screenshot 500 of a point cloud display screen, according to an embodiment of the present disclosure.

The point cloud display screen includes a rendering of the point cloud, showing a high density of points which may be regarded as appearing as a three-dimensional surface 505. As is common in point cloud viewing software, the apparent angles from which the point cloud is viewed can be changed by clicking and dragging on the surface 505, or by interacting with a menu 510. A user coordinate system (UCS) icon 515 is displayed in association with the three-dimensional surface 505, which is updated as the three-dimensional surface 505 is rotated. This enables the operator to keep track of an orientation of the three-dimensional surface 505 as it is rotated, with reference to the coordinate system of the point cloud data, which remains as the original coordinate system throughout.

The coordinate system depends on the orientation of the scanner as the point cloud is captured, and is not specifically related to the geometry of the mill. The coordinate system of the point cloud data may be regarded as being entirely arbitrary.

During import; an approximate centre line 520 of the main, generally cylindrical, region of the point cloud is automatically determined and displayed in association with the three-dimensional surface 505. The centre line 520 is automatically, but coarsely generated based upon the geometry of the point cloud data, with a view to later refining its position. The centre line is added in the coordinate system of the point cloud data, and no transformation of the coordinate system of the point cloud data is performed.

As can be seen from the three-dimensional surface 505, the raw point cloud data includes data irrelevant to the mill liner, including relating to areas outside of the mill, as well as a contents of the mill (e.g. ore and, if present, grinding media). As such, the point cloud data is refined (or cleaned) prior to further analysis.

Figure 6:
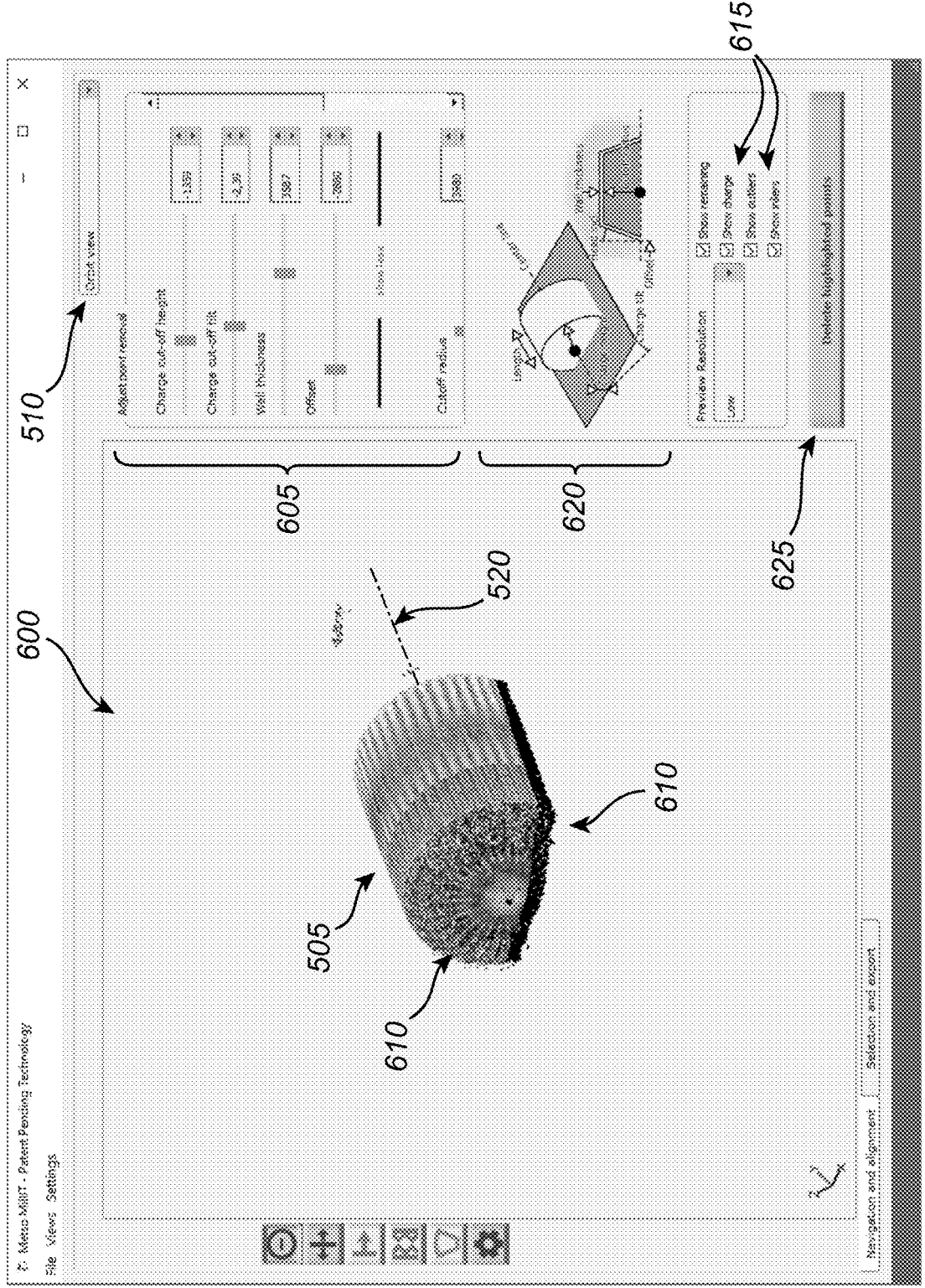
FIG. 6 illustrates a screenshot of a point cloud cleaning screen, according to an embodiment.

FIG. 6 illustrates a screenshot 600, of a point cloud cleaning screen, according to an embodiment of the present disclosure. The point cloud cleaning screen includes the three-dimensional surface 505 which may be rotated, as outlined above, and a plurality of cleaning menus 605.

The cleaning menus 605 comprise tools that enable an operator to manually delete unwanted parts of the point cloud selecting a size and location of a cylinder with conical ends and a plane with an angle.

In particular, the cleaning menus 605 include an inner cut-off radius, which defines a radius of the cylinder, which functions as an inner limit of points to be retained in the point cloud. As such, any inliers, or points well inside the boundary of the cylinder, can efficiently be removed.

The cleaning menus 605 further include a wall margin menu, a length menu, an offset menu, a head inclination menu, to enable the operator to define a wall margin, a length, an offset, and a head inclination of the cylinder with the conical ends. As such, any outliers, or points well beyond the boundary of the wall margin, can efficiently be removed.

Finally, the cleaning menus 605 include a charge (or stonebed) cut-off menu and a charge cut-off tilt menu, to define a height of the charge (i.e. contents of the mill) and a tilt (i.e. an angle of the contents). This is particularly useful as the contents of the mill varies, and is generally not flat (and may be significantly tilted, depending on how quickly the mill was stopped).

As the operator enters parameters into the cleaning menus 605, the three-dimensional surface 505 is automatically updated. This may be achieved by clearly illustrating points that will be removed based upon the parameters (e.g. by showing these points in a different colour), or by simply removing the points from the three-dimensional surface 505. FIG. 6 illustrates an embodiment which displays removal points 610 that are being removed from the point cloud in a different colour, and in one of several different colours depending on what criteria their removal is based. All removal points may then be removed by a user clicking the 'Delete highlighted points' button 625.

The operator may choose to view only specific points that are being removed using preview configuration selection boxes 615. The preview configuration selection boxes 615 include a 'show remaining' box, which enables the operator to select to see points relating to the liner that have not been identified for removal, a 'show charge' box, which enables the operator to select to see points relating to the charge (i.e. the points located under the cut-off plane), and 'show outlier' and 'show inlier' boxes, which enable the operator to select to view outliers and inliers respectively.

Finally, the point cloud cleaning screen includes a legend section 620, which defines a graphical representation corresponding to the parameters of the cleaning menus 605, to enable the operator to gain a quick understanding of what the parameters relate. Each of the cleaning menus 605 can be associated with a number (1-7), and each of these parameters is illustrated in the legend section 620 graphically, and identified in the legend with the corresponding number.

Once the data has been cleaned, more accurate alignment of the centre line of the point cloud data is performed. As mentioned earlier, the centre line 520 is roughly centred based upon the raw point cloud data, and is later refined.

Figure 7:
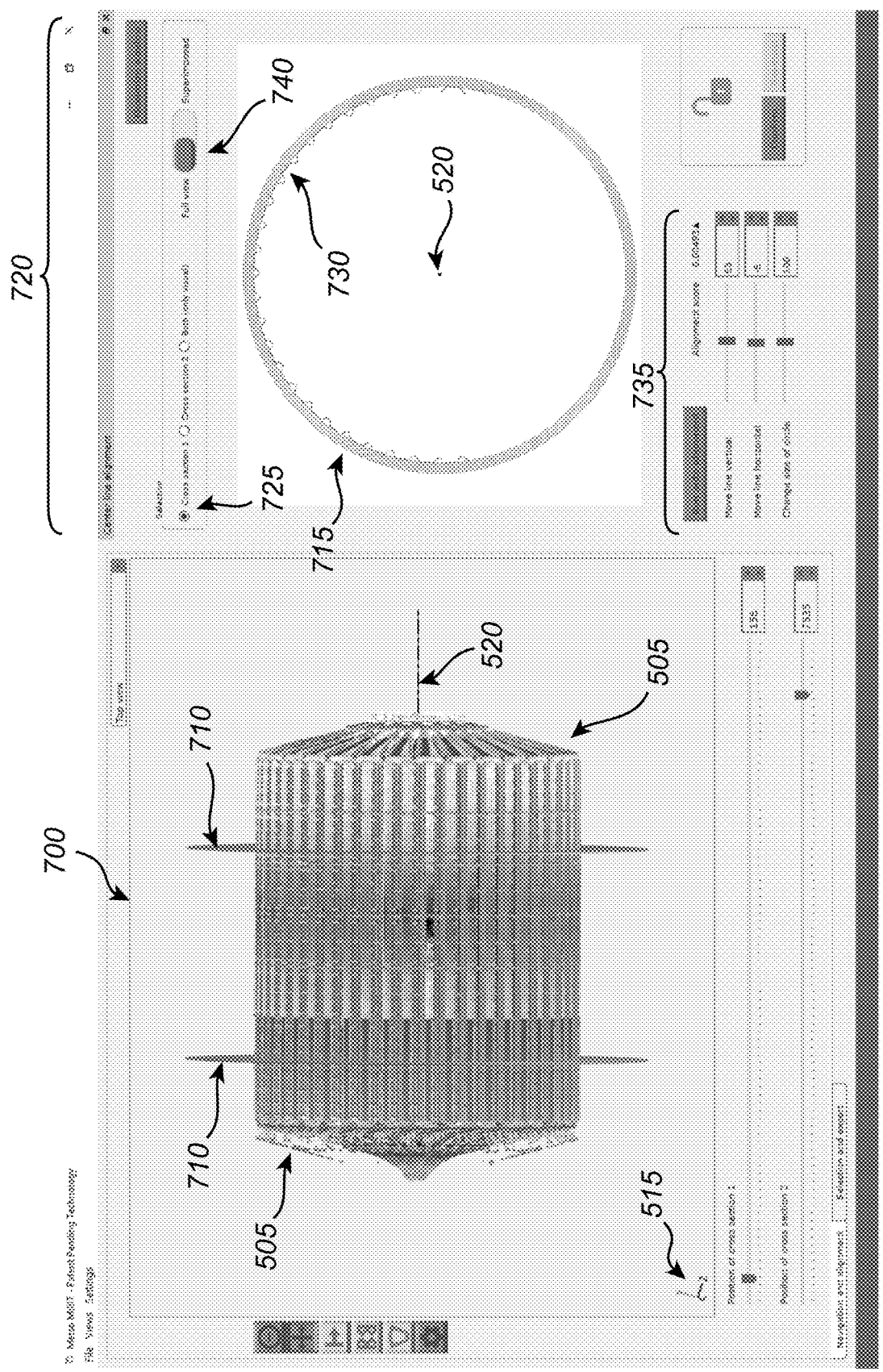
FIG. 7 illustrates a screenshot of a centre line alignment screen, according to an embodiment.

FIG. 7 illustrates screenshot 700 of a centre line alignment screen, according to an embodiment of the present disclosure.

Initially, the first and second planes are defined using plane selection menus 705. The cross section selection menus 705 enable the operator to define two cross sections orthogonal to the centre line 520, defining cross sections of the point cloud data.

The menus 705 comprise slider bars, which enable the operator to select where along the centre line 520 the planes are positioned. As the planes are positioned, first and second plane identifiers 710 are positioned on the three-dimensional surface 505, to enable the operator to view where on the point cloud the planes are positioned.

At the same time, cross section(s) of the point cloud 715 corresponding to the selected planes, are displayed in a centering portion 720 of the centre line alignment screen 700, and with reference to the centre line 520. A menu 725 enables the operator to select which of the cross sections is displayed, including a cross section relating to the first plane, a cross section relating to the second plane, or both cross sections overlaid on top of each other.

A circle element 730 is overlaid over the cross section(s) of the point cloud 715, to assist the operator in interpreting an alignment of the centre line 520. In particular, the circle element 730 has the centre line 520 as its centre, and is useful at identifying small offset errors in the location of the centre line 520.

A centre line adjustment menu 735 enables the position of the centre line 520 to be adjusted, i.e. moved vertically or horizontally, to enable the operator to more accurately centre the centre line 520. As the centre line 520 is moved, the circle element 730 is also moved, enabling the operator to verify that the centre line 520 is more accurately centred based upon the movement.

It will be appreciated that as the centre line is centred in both cross sections, it will be both aligned and positioned centrally in the point cloud.

In addition to the manual centering described above, automatic centering may also be provided. In such case, an automatic centration algorithm may be employed prior to the manual alignment, or on its own, to centre the centre line 520. As such, manual centering may also function to verify the result of the automatic algorithm.

Figure 8:
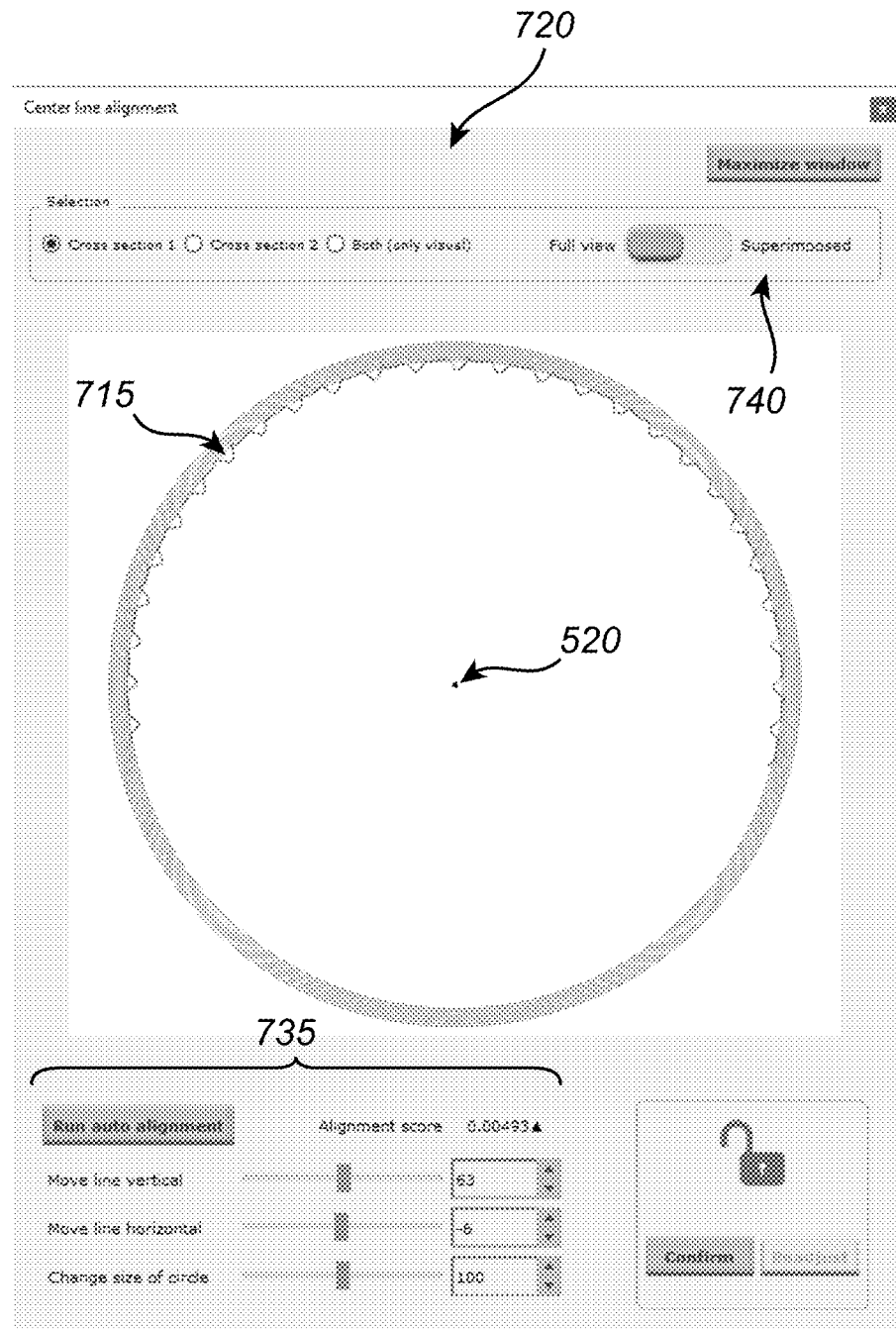
FIG. 8 illustrates an enlarged view of a centering portion of the centre line alignment screen of FIG. 7.
Figure 9:
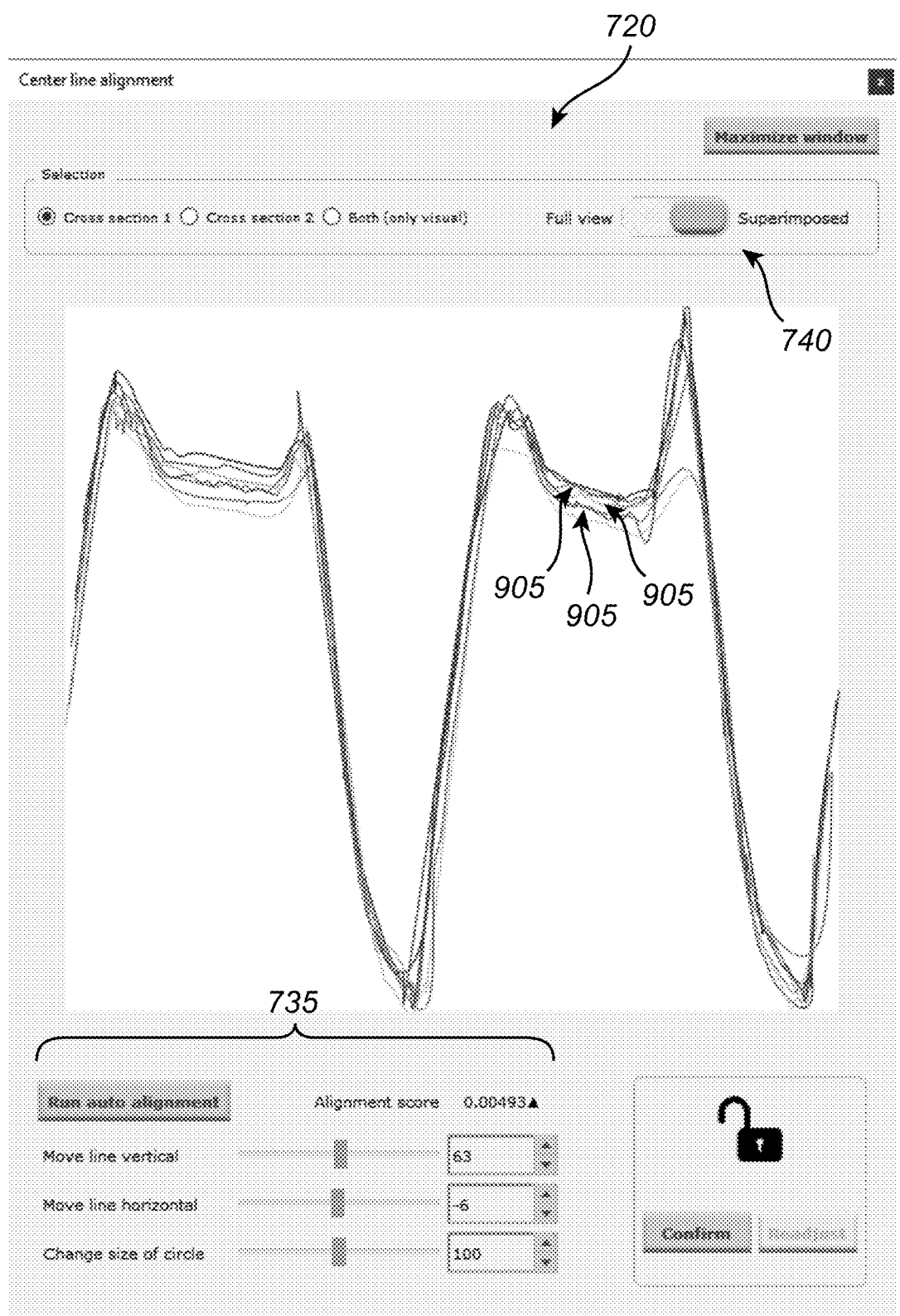
FIG. 9 illustrates an enlarged view of the centering portion of FIG. 8, but in an overlay configuration.

FIG. 8 illustrates an enlarged view of the centering portion 720 in the configuration described in FIG. 7, and FIG. 9 illustrates an enlarged view of the centering portion 720 in an overlay configuration. The overlay configuration may be selected by selecting a 'superimposed' or overlay option, in this embodiment provided by a 'superimpose' toggle 740 in the centering portion 720, and the operator may thus toggle between these configurations.

The overlay configuration is generated by dividing the cross section into slices, extending outwardly from the centre line 520, and rotating the slices around the centre line 520 such that cross sections of the slices 905 are overlaid. The operator may then zoom into a specific area of overlap, and fine tune a location of the centre line 520, using the centre line adjustment menu 735. When the overlaid regions are closely aligned the position of the centre line is good.

Instead of overlaying all slices, a sample of slices (e.g. every third or every second slice) are shown on top of each other. This is particularly useful when slices are small, as it avoids having many slices overlaid on top of each other.

When analysing a central (cylindrical) portion of the liner, it is desirable to set reference points and boundaries for data analysis.

Figure 10A:
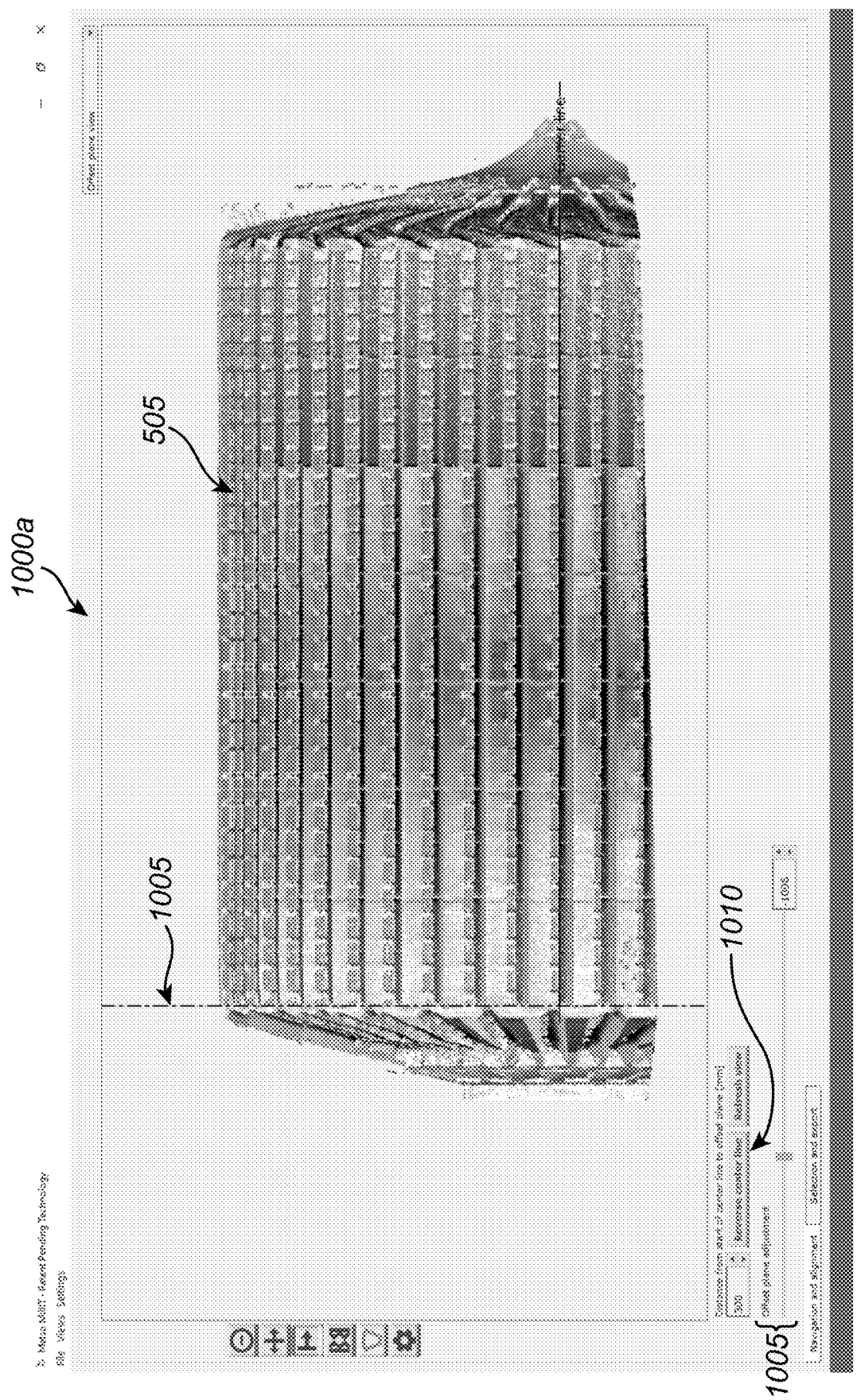
FIG. 10a illustrates a screenshot of a start point selection screen, according to an embodiment.

FIG. 10a illustrates a screenshot 1000a of a start point selection screen, according to an embodiment of the present disclosure. The start point selection screen enables a start point to be identified with reference to the three-dimensional surface 505. The start point (which corresponds to the end of the cylinder) is useful providing context for the operator when considering characteristics of the liner, along its length.

In particular, a start plane element 1005 is moved along the centre line 520 to a known position of the lining, based upon a visual inspection by the operator of the three-dimensional surface 505. When the start plane element 1005 is in approximately the right position, the three-dimensional surface 505 may be enlarged, to more accurately position the start plane element 1005.

Figure 10B:
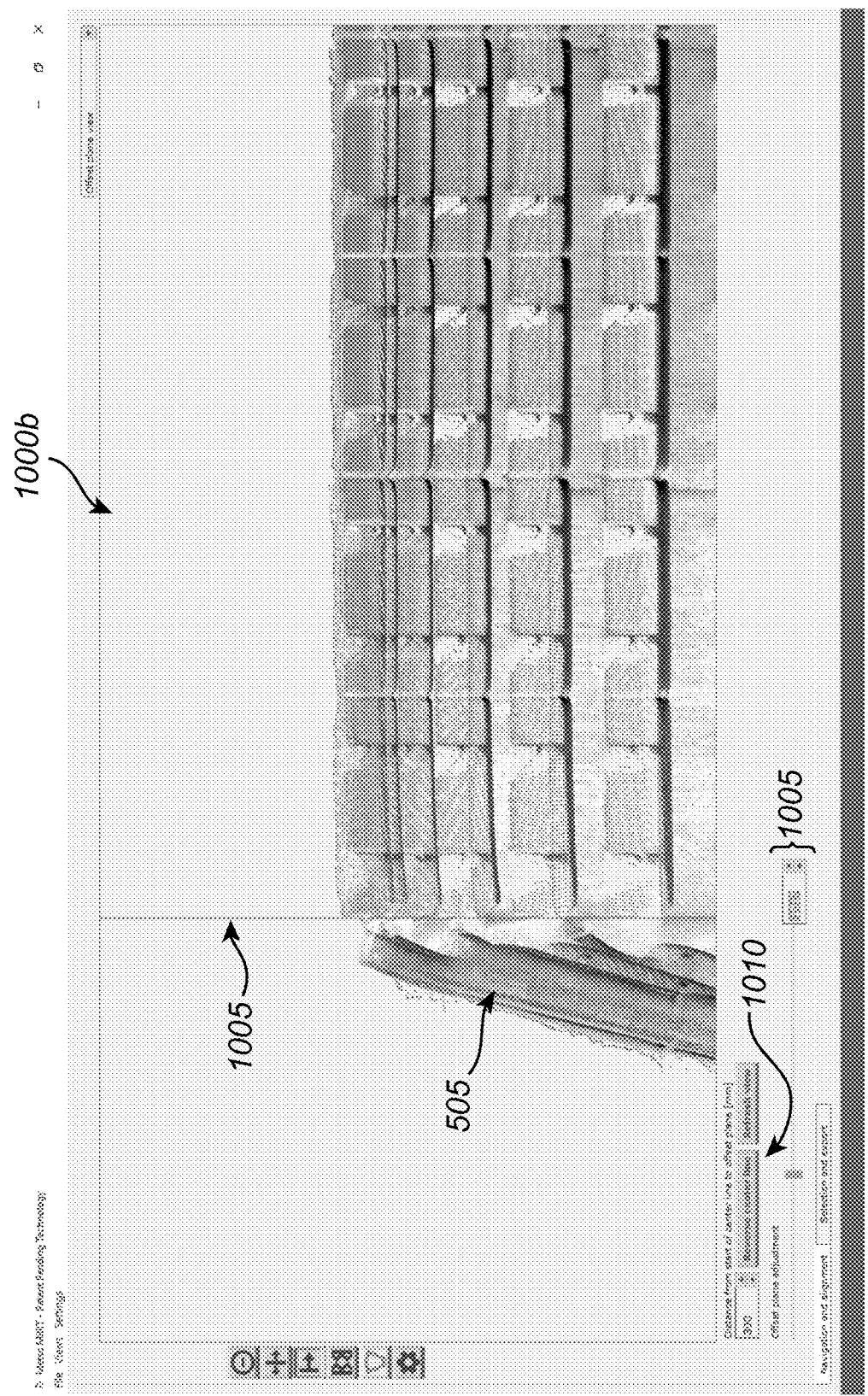
FIG. 10b illustrates a screenshot of the start point selection screen of FIG. 10a, with a three-dimensional surface thereof enlarged.

FIG. 10b illustrates a screenshot 1000b of the start point selection screen, with the three-dimensional surface 505 enlarged to enable more accurate positioning of the start plane element 1005. As can be seen from FIG. 10b, by enlarging the three-dimensional surface 505 (and thus only displaying a portion thereof), significant further detail can be identified, simplifying the process for positioning the start plane element 1005.

The start point selection screen further includes a reverse central line button, which, when selected, reverses the displayed position of the FE and DE between left and right.

Finally, the start point reference selection screen includes a start point offset, which defines an offset between the position of the start plane element 1005 (e.g. a portion of the liner) and a start of the cylinder of the mill. The operator would generally enter these details based upon knowledge of the lining.

Defining a start point as outlined above, enables the operator to subsequently define regions of the liner along a length thereof, using a commonly used reference point, namely the cylinder.

Not all measurements in the point cloud are representative of wear in the liner. As an illustrative example, there are often areas of increased wear near the ends of the liners. These should generally not be included in the exported data, as it may indicate that the liner is more worn than it actually is. As such, it is desirable to define deadbands in the analysis, namely bands of data which are not used to generate minimum or maximum values.

Figure 11:
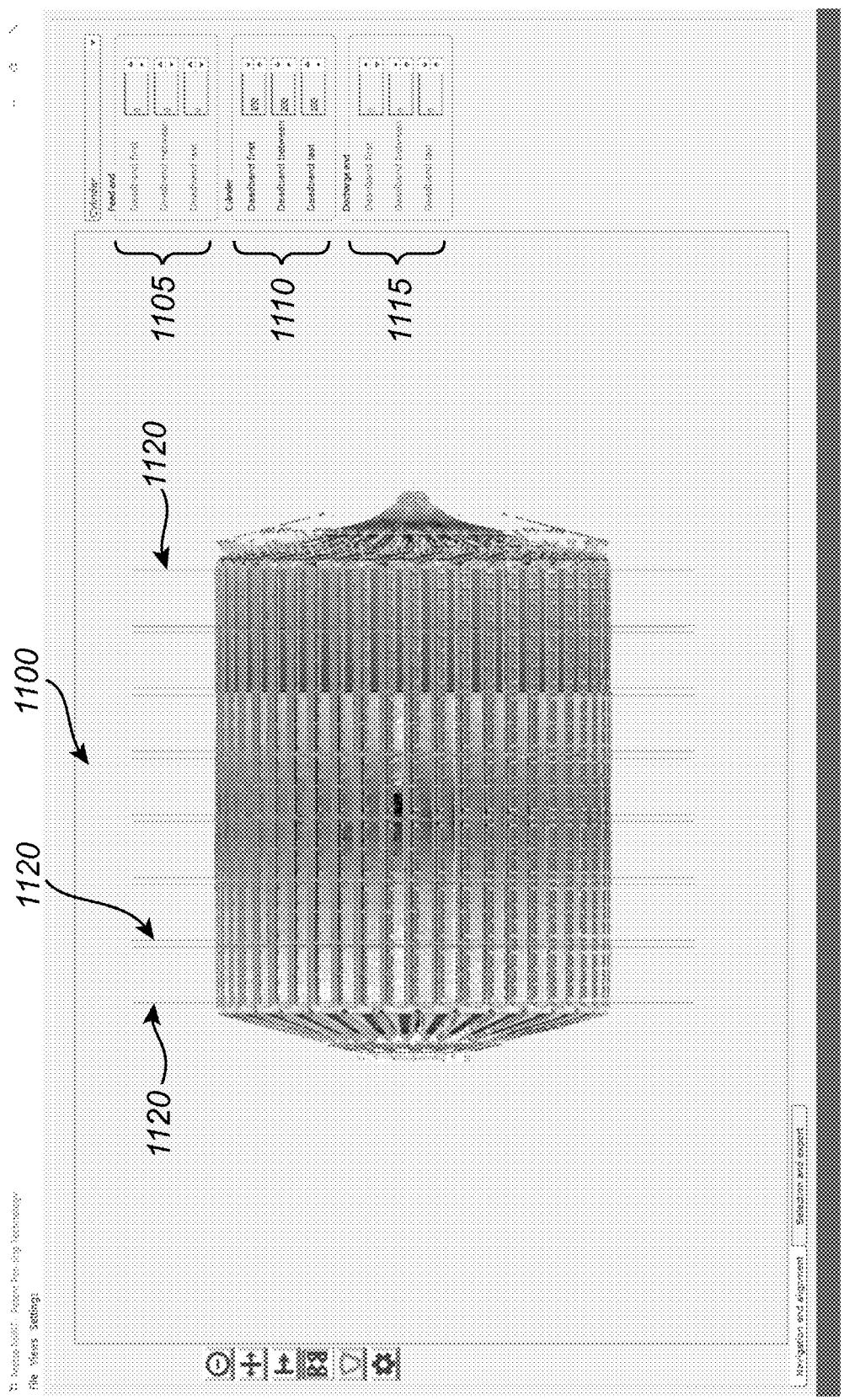
FIG. 11 illustrates a screenshot of a deadband selection screen, according to an embodiment.

FIG. 11 illustrates a screenshot 1100 of a deadband selection screen, according to an embodiment of the present disclosure.

The deadband selection screen includes a feed end deadband selection menu 1105, a cylinder (or central portion) deadband selection menu 1110, and a discharge end deadband selection menu 1115 to enable deadbands to be defined in the feed end, the cylinder (or central portion) and the discharge end, respectively.

Each deadband defines a set of 3D data points which are excluded from consideration when generating the scalar measurement data. This enables the operator to select to remove from the calculation the ends of the liners, for example.

The feed end deadband selection menu 1105, the cylinder (or central portion) deadband selection menu 1110, and the discharge end deadband selection menu 1115 are all defined with reference to the start point defined above. As such, the operator is able to easily identify the ends of liners with reference to a well understood reference point (e.g. the start of the cylinder).

Finally, the data is selected for export by the operator. This enables the operator to specifically avoid anomalies in the data, if desired, and remove further noise from the data.

Figure 12:
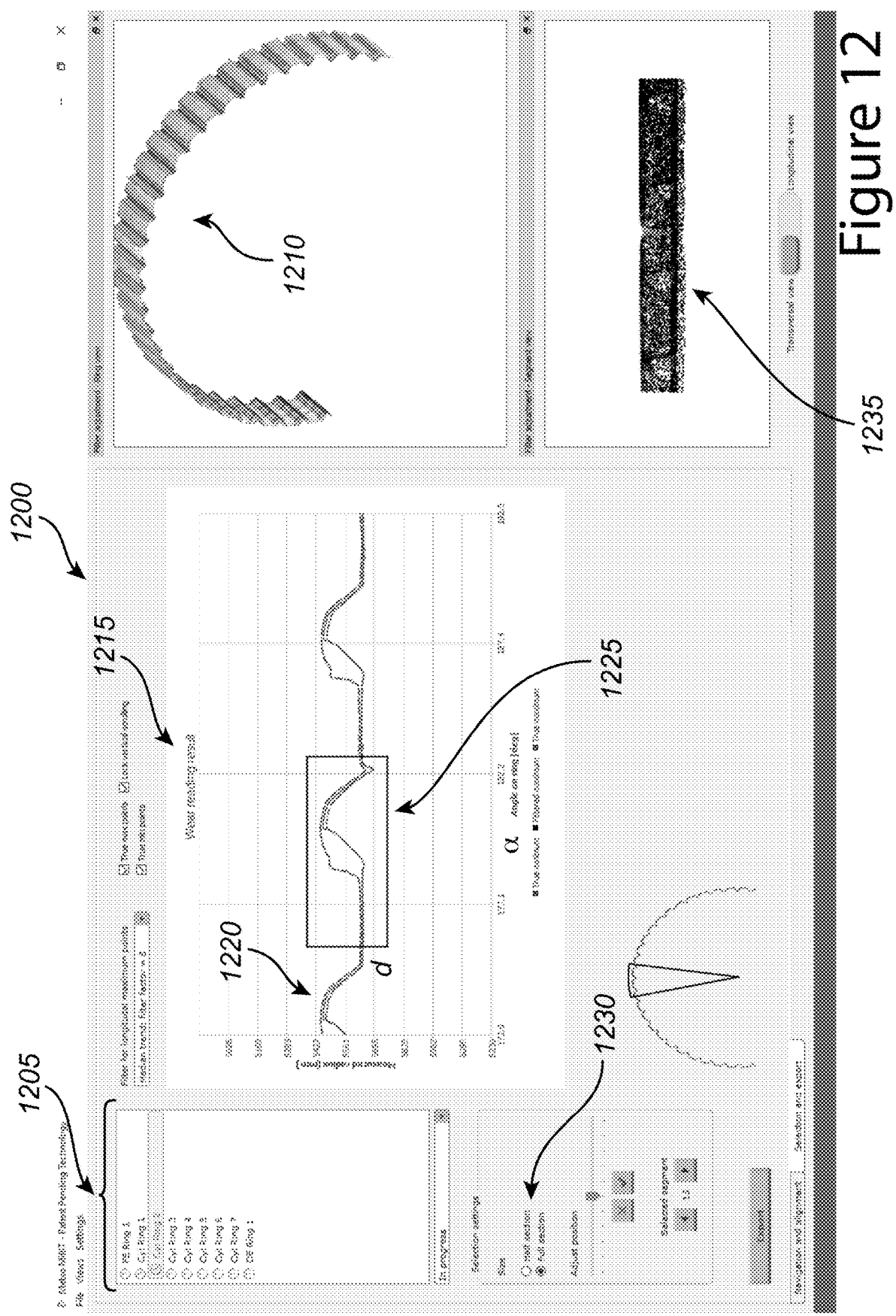
FIG. 12 illustrates a screenshot of a data export screen, according to an embodiment.

FIG. 12 illustrates a screenshot 1200 of a data export screen, according to an embodiment of the present disclosure. The data export screen enables selection of data for export (e.g. a segment of data), as well as filtration of the data to remove noise.

The data export screen includes a ring selection menu 1205, which enables the operator to consider and filter each ring individually. In this case, the ring selection menu 1205 enables the operator to select between a FE ring, first to seventh cylinder (or central) rings, and a DE ring. It will be appreciated that it is common for mill liners to comprise a number of relatively axially short generally cylindrical liner 'rings'.

Upon selection of a ring, a corresponding relevant part (appearing like a 3D surface 1210) of the point cloud, is illustrated. This enables the operator to get a quick overview of the ring that is selected.

Generally, wear of the different liner rings will be assessed separately so that each part (maximum distance value) that is exported will correspond to the maximum distance value along the length of one ring, at a given angle.

The data export screen includes a filter menu 1215, enabling the operator to select a filter to apply to the data points, to remove outliers. The filter may, for example, comprise a median filter with suitable parameters, or any other suitable filter. The filters may be particularly useful in removing lifting lugs, rocks, holes and the like from consideration.

The filter may be based on curvature analysis of the point cloud surface to exclude points (or regions) where perceived wear does not change gradually. Such regions typically would not correspond to wear, but to holes and objects in or on the liner surface.

As filter parameters are entered, the data in the corresponding 3D surface 1210 is updated to illustrate which data is removed and/or changed. This may be performed by illustrating the removed and/or changed data in a different colour.

Scalar measurement data 1220 associated with a portion of the data corresponding 3D surface 1210 is displayed in two-dimensional plot, illustrating magnitude with reference to angle (a).

A window 1225 is provided with reference to the two-dimensional plot, the window 1225 defining an area to be exported. The side of the window may be defined in a window configuration menu 1230, and may be selected from widths being a whole segment, and a half segment.

The data export screen further includes a segment view element 1235, which illustrates the segment associated with the window 1225, from its side (i.e. parallel to a tangent of the mill liner). This enables the operator to easily see the points comprising the selected segment, including those that are being removed or updated by the filter.

In addition to showing the scalar measurement data 1220, the plot illustrates raw (unfiltered) maximum and minimum values for each angle (a). This enables the operator to quickly get an overview of the impact of this filtering on the output data directly.

Once the data is finalised for export, only the scalar measurement data 1220 that lies within the window 1225 is exported—any unfiltered data provided for reference is not exported, nor is data outside of that window. The data is exported as a string of values for each ring.

The exported data can then be used to estimate a thickness or condition of the wear surface (e.g. mill liner). As an illustrative example, the exported data can be compared with reference data relating to the mill liner, such as minimum threshold values.

By comparing the exported data with corresponding reference data, significant complexity and bandwidth reductions can be achieved when compared with exporting point cloud data and comparing that with some corresponding reference data.

The above description primarily describes how the scalar measurement data is selected and analysed in relation to central portions of the mill liner. The skilled addressee will readily appreciate that the methods can be adapted to suit the frustoconical FE and DE rings, as well as other types of conical or frustoconical material handling systems, such as crushers.

Figure 13:
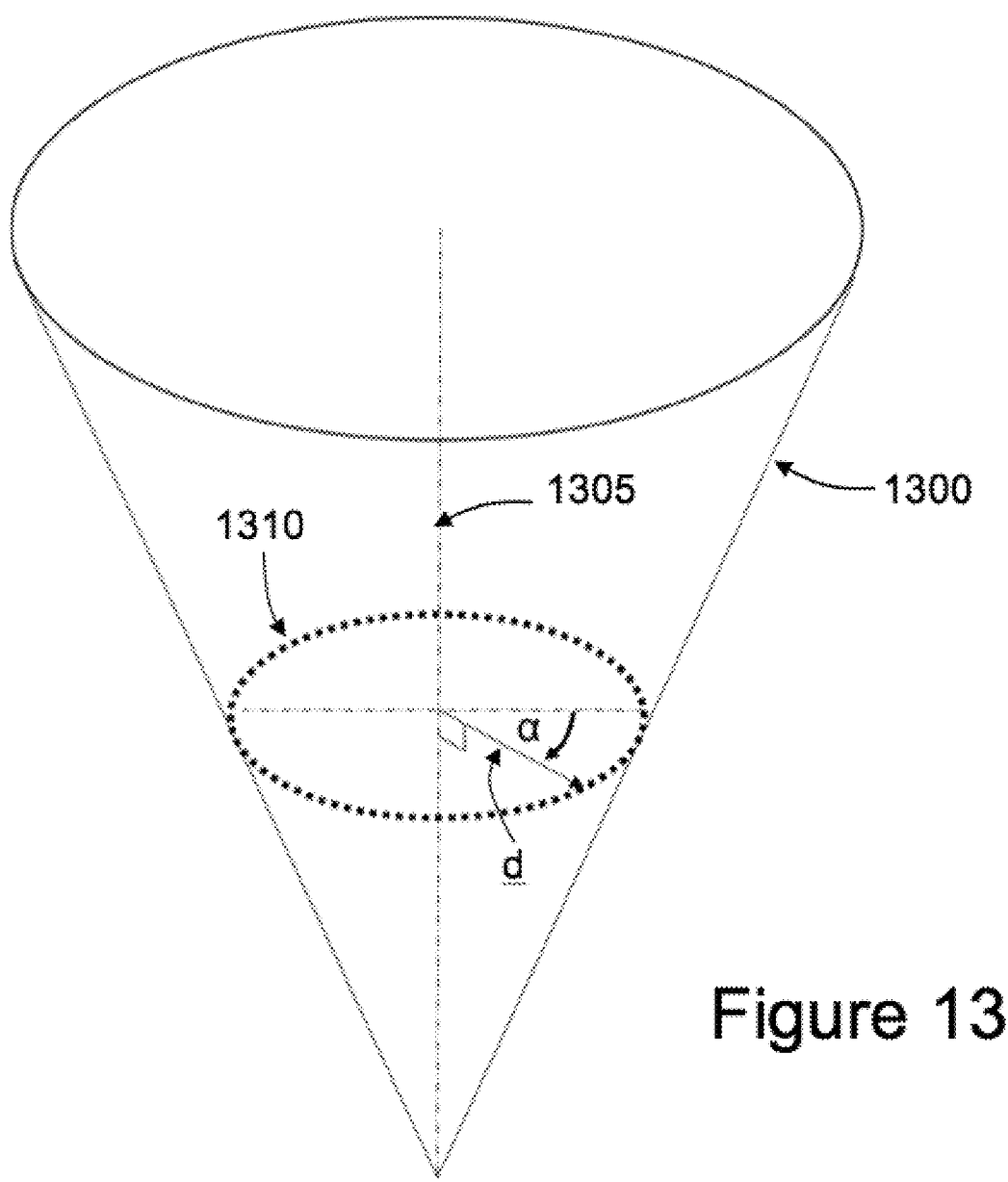
FIG. 13 illustrates a schematic perspective view of a point cloud representation of a conical material handling surface, according to an embodiment.

FIG. 13 illustrates schematically a point cloud 1300 representing a laser scanned conical or part conical (including frustoconical) material handling surface, according to an embodiment of the present disclosure. The point cloud 1300 may correspond to a surface of a cone crusher. Similarly, the measurements outlined in relation to the point cloud 1300 below may be applied in relations to frustoconical surfaces, such as the FE and DE rings of a liner.

The point cloud 1300 has an associated centre line 1305, and subsets of point cloud data 1310 are generated according to a distance along the centre line 1305. Accordingly, each subset of point cloud data 1310 may comprise points at all angles around a particular point on the centre line 1305 (in contrast to all points at a particular angle, as was the case for the generally cylindrical mill liner). Alternatively, or additionally, it is possible, and may be desirable in some embodiments to use subsets of points in which the points of each subset are distributed differently, such as, for example, in a line which extends in a direction generally following a length direction of the wear surface.

The point cloud 1300 is illustrated with reference to a cone that roughly corresponds to the conical material handling surface, for clarity purposes only. The skilled addressee will readily appreciate that the surface is not entirely conical. In fact, the generation of scalar measurement data based upon the subsets described in FIG. 13 is directly applicable to any shape that is generally axially symmetrical.

The subset of the point cloud data 1310 comprises a ring of values around the cone, and each other subset is similar to the point cloud data subset 1310, but at a different point along the centre line of the cone.

For each subset of points from the point cloud, a distance is determined for each point in the subset from the centre line 1305 in a direction normal to the centre line 1305. This is achieved in the same way as the distance calculations above for a cylindrical mill liner. A single distance, for example the maximum determined distance for the subset, may be selected. The selected distances for the respective subsets may then be exported.

It will be appreciated that the orientation of the subset is chosen based on the structure and geometry of the surface that is to be analysed.

By way of non-limiting example, for a generally cylindrical surface (such as a cylindrical part of a mill liner) which has predictable structures, such as lifter bars, which extend in the axial direction, the subsets may be selected to correspond to strips of points that extend parallel to the direction of orientation of the structures (e.g. lifter bars). In assessing a cylindrical part of a mill liner this can avoid having some of the points in a subset corresponding to points on a lifter bar while other points in the same subset correspond to points on the relatively recessed surfaces between the lifter bars, which could lead to the distance determinations for each point being likely to indicate the presence or absence of a lifter bar, rather than being indicative of surface wear. For a generally conical surface (or more generally, a tapering axially symmetrical surface) for example of a cone crusher, the subsets may be selected to correspond to approximate circles of points that extend around the axis of symmetry. If subsets comprising axially extending strips of points were to be used in such a structure, the distance determinations for each point might then be likely to indicate the different transverse positions of points due to the taper of the surface, rather than being indicative of surface wear. For a wear surface which is generally shaped as a smooth cylinder, either (or both) of the above types of subset could be used. For the discharge and inlet ends of a mill liner pending on the surface a suitable orientation for the subset should be selected, depending on the structure and geometry of the surface. However, in considering the applicability of these examples of subset selection, it should be appreciated that variations are possible.

One convenient way to select the type and orientation of the subsets may be to select subsets such that the points of each subset would substantially each give rise to the same determined distance if the surface were completely regular or completely unworn.

As foreshadowed above, deadbands may also be used to assist relevance of the assessment. For example, openings in liners and joints between liner parts are examples of suitable selections for deadbands.

While the system 100 illustrates initial analysis on the computer 130, and subsequent wear analysis on the server 140, the skilled addressee will readily appreciate that both steps may be performed on a single computing device, such as the operator computer 130. Such approach still avoids large amounts of data processing, even when used on a single machine.

While a laser scanner 125 is described, the skilled addressee will, however, readily appreciate that any number of other scanners may be used, including infrared scanners, radar scanners or the like, to generate the point cloud, without departing from the scope of the disclosure.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present disclosure. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A system for analysing a three-dimensional wear surface in a material handling system to generate scalar measurement data therefrom, the system including:
   a scanner, configured to generate point cloud data of the three-dimensional wear surface; and
   a processor, configured to receive the point cloud data and generate the scalar measurement data therefrom by:
      generating a plurality of subsets of points of the point cloud data; and
      from each of the plurality of subsets, selecting a single scalar measurement associated with a point of the subset, wherein the plurality of single scalar measurements from the plurality of subsets form the scalar measurement data.

2. The system of claim 1 wherein the scalar measurement for each point of each subset is a distance from a center line to the point.

3. The system of claim 2 wherein the single scalar measurement selected for each subset is from the point having the maximum distance from the center line.

4. A method for analysing a three-dimensional wear surface in a material handling system to generate scalar measurement data therefrom, the method including:
   scanning, with a scanner, the three-dimensional wear surface to generate point cloud data; and
   generating the scalar measurement data from the point cloud data by:
      generating a plurality of subsets of points of the point cloud data; and
      from each of the plurality of subsets, selecting a single scalar measurement associated with a point of the subset, wherein the plurality of single scalar measurements from the plurality of subsets form the scalar measurement data.

* * * * *